Figure 1A:
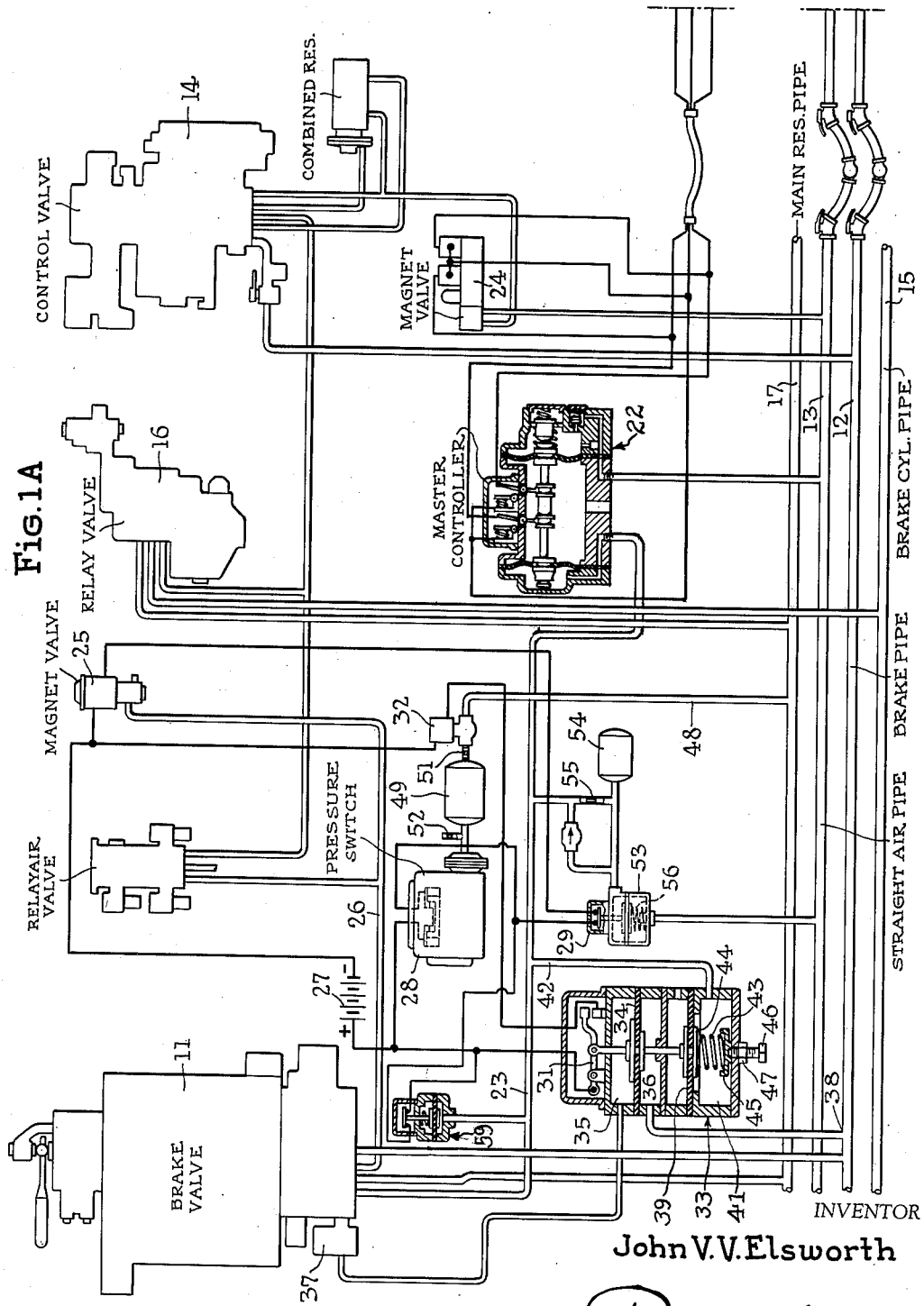

March 13, 1956 J. V. V. ELSWORTH 2,738,235
PROTECTION DEVICE FOR AIR BRAKES
Filed Sept. 22, 1952 3 Sheets-Sheet 1

INVENTOR
John V. V. Elsworth
BY Dodge and Sons
ATTORNEYS

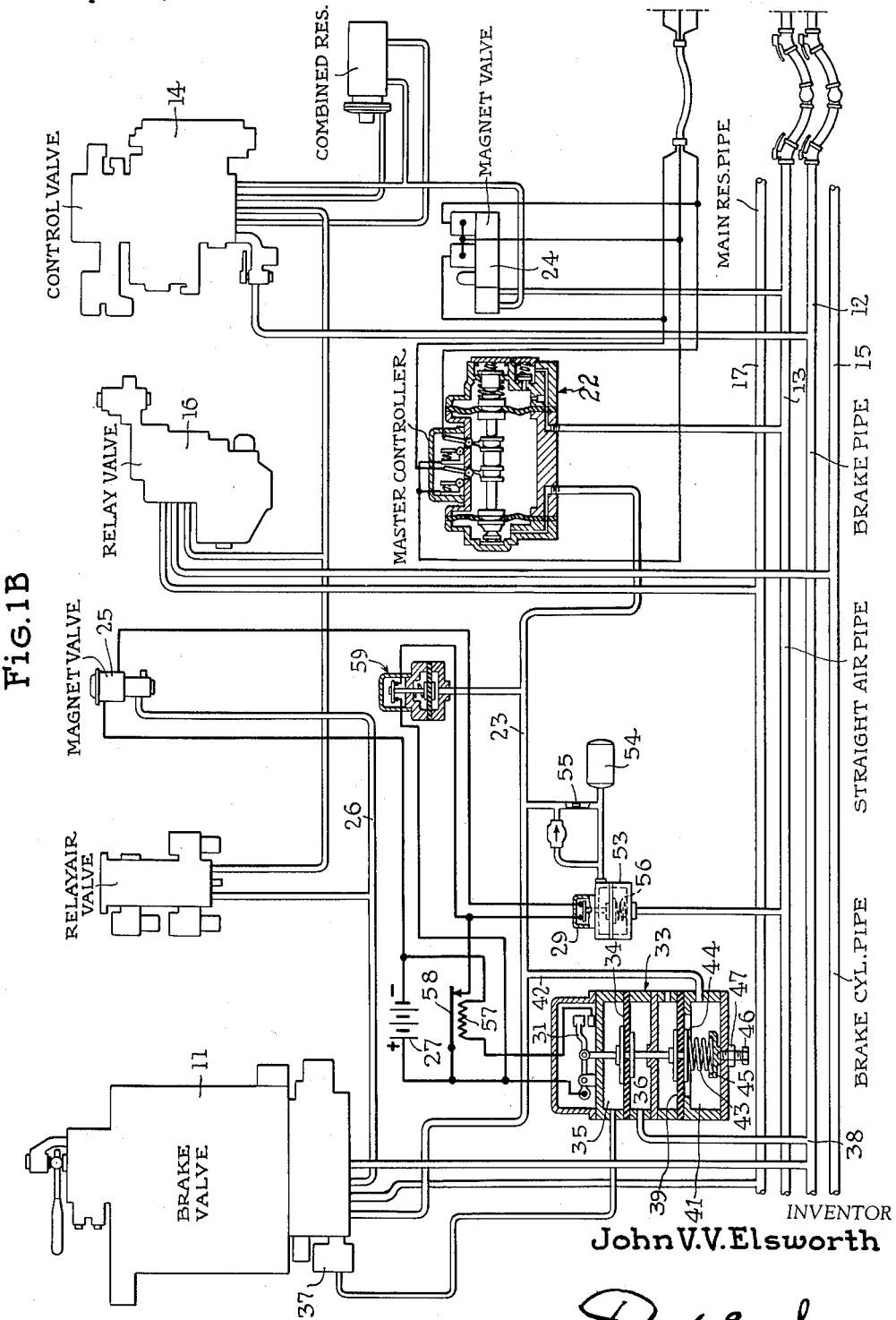

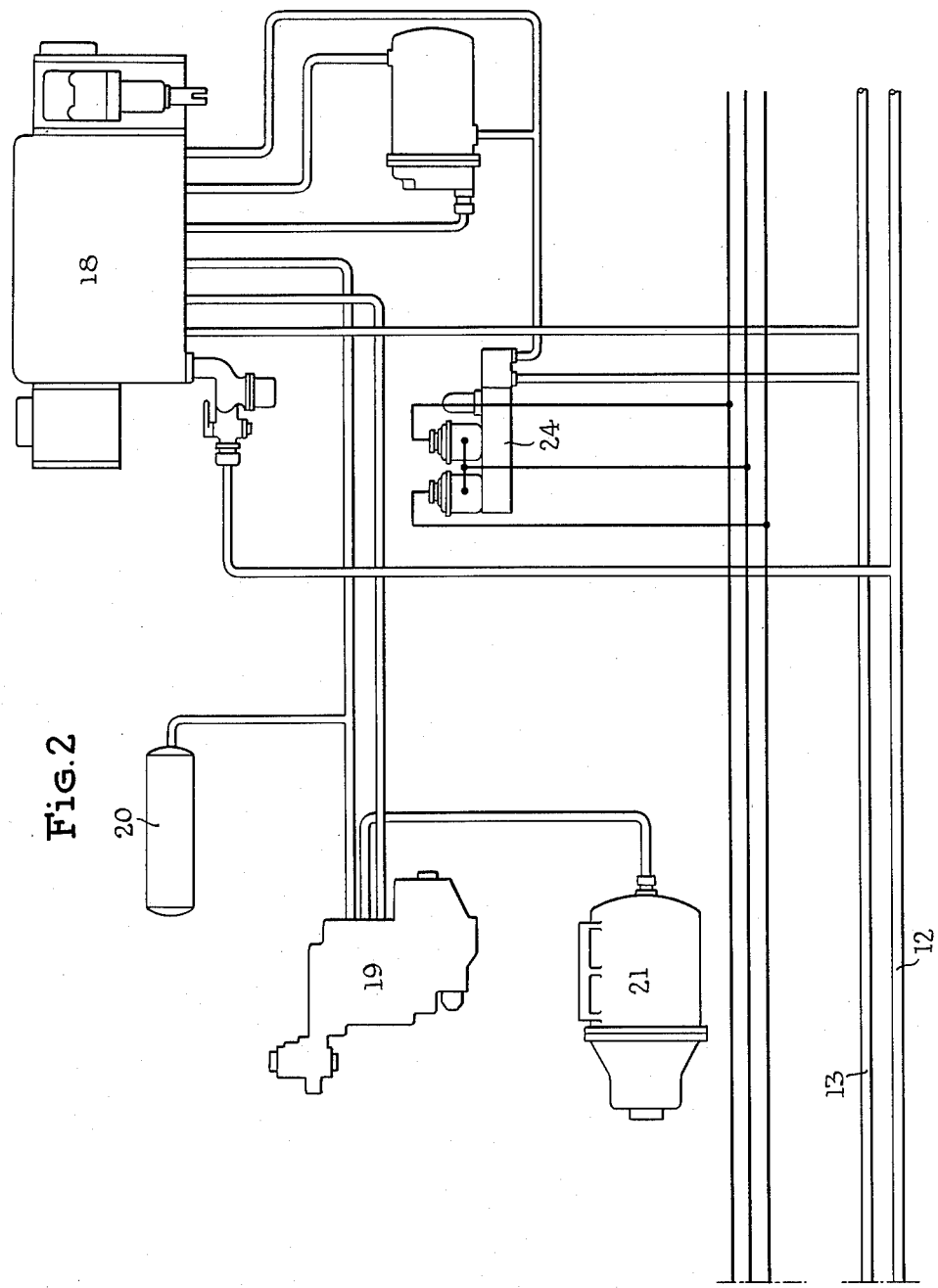

United States Patent Office 2,738,235
Patented Mar. 13, 1956

2,738,235

PROTECTION DEVICE FOR AIR BRAKES

John Van Varick Elsworth, Watertown, N. Y., assignor to The New York Air Brake Company, a corporation of New Jersey Application September 22, 1952, Serial No. 310,862

10 Claims. (Cl. 303—26)

This invention relates to air brakes and particularly to safety systems for straight-air brakes. As a basis for disclosure the invention will be described as it is applied to the familiar 24RL brake equipment. A full description of this 24-RL equipment is contained in The New York Air Brake Company's Instruction Pamphlet No. 59, dated May 1948, and entitled "24-RL Brake Equipment." A copy of this pamphlet was filed with application Serial No. 100,928, filed June 23, 1949, and now Patent No. 2,527,920, dated October 31, 1950.

Basically this is a dual brake system having a complete automatic brake system and a complete electro-pneumatic straight-air brake system. The two systems exist side by side throughout the train. They are controlled by a single engineer's brake valve which may be set to operate the two systems selectively by the manipulation of a two position selector mechanism.

It is characteristic of this brake equipment that the brake pipe of the automatic system is normally charged without regard to which system is being used. The emergency position of the engineer's brake valve will produce an automatic emergency application of the train brakes regardless of the position of the two-position selector. Also a break-in-two will always produce an automatic emergency brake application. Thus both of the major safety features of the automatic brake are continuously effective for use in emergencies.

Since the selection between the two systems is easily accomplished the failure of the electro-penumatic brakes to function properly should not interfere with train operation. It is possible, however, that faulty operation of the electro-penumatic system may not be immediately apparent to the engineer during normal service operation. The present invention is directed to means to apply the automatic brakes whenever the operation of the electro-pneumatic straight-air system is seriously impaired.

In the 24RL equipment, for example, the brake pipe of the automatic system during electro-pneumatic straight-air operation serves to deliver air to the supply reservoirs on the cars. This charging flow is at a maximum when the brakes are being applied and air drawn from these reservoirs to the straight-air pipe and to the brake cylinders. After the straight-air pipe and the brake cylinders are charged, the reservoirs continue to be charged from the brake pipe until the pressure is restored. During this recharging, the flow through the brake pipe progressively decreases until it reaches a minimum. Leakage from the straight-air pipe or from the brake cylinders will prolong this recharging time and under certain conditions may even cause the flow to remain above this minimum. This invention makes use of this characteristic of faulty brake operation to operate a safety device which under conditions of unsafe brake operation will cause an automatic service application of brakes which can be released only if the two-position selector is shifted to cause automatic brake operation.

The engineer can then continue his run using the automatic brakes or he may seek out the cause of the faulty operation and correct it.

Basically the safety device includes a differential pressure mechanism which is actuated by the rate of flow through the brake pipe. This mechanism, when actuated by this pressure differential, actuates a safety device. This safety device is of a delayed action type in which energy is accumulated at a constant rate. The excessive accumulation of energy is caused to actuate some means to apply the automatic brakes. Because of the time delay feature, the charging flow may continue for a predetermined interval. If during this interval the flow does not return to a normal level, the automatic brakes will be applied.

The charging interval depends upon two primary factors: the force with which the brakes are applied by the straight-air system and the length of the train. These variables are taken into account in the following way. The control pipe pressure which varies proportionally to the braking force, is used to actuate a pressure motor which acts in opposition to the differential pressure mechanism. This means that the rate of flow through the brake pipe required to actuate the differential pressure mechanism increases with the braking force. Secondly an adjustable, continuously effective bias is exerted on the differential pressure mechanism which can be set to adjust the differentiarl pressure required to actuate the safety device having regard to the length of the train.

The invention will be described having reference to the accompanying drawings in which Fig. 1A is a diagram of so much of the 24RL locomotive equipment as is affected by the invention and shows the invention embodied in this equipment.

Figure 1B is a diagram similar to that shown in Fig. 1A in which a modified form of the invention is illustrated.

Fig. 2 constitutes a diagram of the 24RL equipment as it exists on a single car in the train.

Fig. 1A and Fig. 2 when assembled end to end in the order stated constitute a diagram of the brake system as it exists on the associated locomotive and car.

Figs. 1B and 2 when arranged end to end constitute a similar diagram of the train equipment.

Referring first to Figs. 1A and 2 the 24RL locomotive equipment includes an engineer's brake valve 11 which is selectively operable to control the pressure in a normally charged brake pipe 12 and in a normally vented straight-air pipe 13. The brake pipe 12 constitutes car length sections in free communication with each other. The straight-air pipe 13 consists of a plurality of interconnected car length sections which are semi-isolated by chokes between sections. Operatively associated with the brake pipe 12 is a control valve 14 which in turn controls the charging of the brake cylinder pipe 15 through the operation of the relay valve 16. Air is delivered to the brake cylinder pipe through the relay valve 16 from the main reservoir pipe 17 during brake application.

As shown in Fig. 2, the equipment on each car includes sections of the straight-air pipe 13 and the brake pipe 12. The car equipment also includes a control valve 18, a relay valve 19, a supply reservoir 20, and at least one brake cylinder 21.

The control valve 18 includes a triple valve and when the brake pipe is charged thereby maintaining the triple valve in release position, an open flow passage is established by this valve between the brake pipe 12 and the supply reservoir 20. This valve has other functions during automatic brake operation, but during electro-pneumatic operation it remains in release position, unless an emergency application is made.

When the engineer's brake valve is set to operate the brakes of the electro-pneumatic straight-air system, it controls the pressure in the straight-air pipe 13 indirectly through a pneumatically actuated master controller 22. The operation of the master controller 22 is piloted by the charging and venting of the control pipe 23. The master controller 22 controls the energization of an electric circuit which includes the magnet valves 24, there being a magnet valve on each locomotive unit and each car unit of the train. When the electro-pneumatic straight-air system is being employed, the control valves 14 and 18 remain in their release position and serve only to establish charging connections between the various parts of the equipment. When the control pipe 23 is charged thus moving the master controller to its application position and energizing the magnet valves 24, the semi-isolated sections of the straight-air pipe 13 on the locomotive and car units are charged from the auxiliary reservoir portion of the combined reservoirs (indicated by legend). The master controller 22 includes follow-up means, and when the straight-air pipe pressure on the locomotive reaches a certain value, dependent on the pressure in the control pipe it assumes a position in which charging of the straight-air pipe is terminated by the magnet valve 24. When the control valves 14 and 18 are in their release positions the supply reservoirs 20 of the car units are connected to be charged from the brake pipe 12. The brake pipe 12 is always charged when the electro-pneumatic brake system is in operation and therefore the charging flow to the supply reservoirs occurs even when the electro-pneumatic brakes have been applied.

It will be understood that there is some flow throughout the brake pipe at all times. This flow serves to replenish such leakage as may occur from the system. The operation of the equipment as described up to this point will be familiar to those skilled in the art and except insofar as it concerns the operation of the present invention no detailed description of this operation will be made.

Included in the locomotive equipment is a magnet valve 25 which is normally energized and closed. De-energization of the magnet valve 25 opens a vent from the pipe 26 and causes an automatic service application of the brakes which is beyond the control of the engineer. Connected in series with the coil of the magnet valve 25 is a source of current typified by the battery 27, a normally closed pressure switch 28, and a normally closed pressure switch 29. Connected in parallel with the switches 28 and 29 and magnet valve 25 are a normally open differential switch 31 and the coil of the magnet valve 32.

Operatively associated with the switch 31 is a differential pressure motor 33. The differential pressure motor 33 includes a flexible diaphragm 34 on either side of which are working spaces 35 and 36. The working spaces 35 and 36 are respectively connected to the brake pipe 12 at spaced points, for example near the feed valve 37 and at a point remote from the feed valve 37, for example the connection shown at 38.

Differential motor 33 also includes a second motor constituting a flexible diaphragm 39 which has a working space 41 connected with the control pipe 23 by the pipe 42. A spring 43 is mounted between the diaphragm follower 44 and a spring seat 45. A manually movable adjusting screw 46 extends through the housing of the motor 33 and may be moved to vary the bias of spring 43 against the diaphragm 39. A lock nut 47 is provided to maintain the set screw 46 in its adjusted position.

The magnet valve 32 controls the charging flow through the pipe 48 from the main reservoir pipe 17 to a timing reservoir 49. A restriction 51 controls the rate of this flow. The timing reservoir 49 is also provided with a constantly open restricted vent 52. The vent restriction is smaller than the restriction 51. The valve 32 is normally closed but opens whenever the switch 31 is closed by the differential pressure motor 33.

The normally closed pressure switch 29 is actuated by a differential pressure motor 53, the working spaces of which are respectively connected to the straight-air pipe 13 and to the control pipe 23. The working space connected to the control pipe 23 includes a timing reservoir 54, and is charged from the control pipe through the restriction 55. A spring 56 reacts on the diaphragm of the motor 53 to maintain the switch 29 in its closed position except when a preponderance of pressure develops in the motor working space connected to the control pipe 23.

The pressure switch 28 is connected to be actuated by the accumulation of pressure in the timing reservoir 49.

The equipment shown in Fig. 1B is similar to that shown in Fig. 1A but includes a modified form of safety device. The safety device embodied in Fig. 1B includes a differential pressure motor 33 and the normally open switch 31 associated therewith. Connected in series with the switch 31 and the battery 27 is a heater element 57. A thermostatic switch element 58 is arranged to be heated by the heater 57 whenever it is energized by closure of the switch 31. The thermostatic switch is connected in series with the battery 27, the switch 29, and the magnet valve 25. The thermostatic switch 58 is opened whenever its temperature exceeds a predetermined amount. The opening of the switch 58 causes the magnet valve 25 to be de-energized thus producing an automatic application of the brakes.

A pressure operated switch 59 is connected to the control pipe 23. This switch is normally closed and shorts out the switch 28 in Figure 1A and the switch 58 in Figure 1B. The switch 59 opens whenever the control pipe 23 is charged to a pressure above say three pounds per square inch. The magnet valve 25 can not be de-energized by the safety device when the switch 59 is closed. Since the control pipe 23 is not charged during automatic operation of the brake system, the movement of differential pressure motor 33 which may occur during automatic operation of the brakes cannot cause magnet valve 25 to be de-energized to cause an automatic application of the brakes.

The operation of the equipment will be first described having reference to the equipment shown in Figs. 1A and 2. Assuming that the electro-pneumatic brake system is being used, an application of the brakes may be initiated charging the control pipe 23 by operation of the engineer's brake valve 11. As has been described, charging of the pipe 23 causes the master controller to move to application position, and energizes the magnet valves 24 whereby the straight-air pipe is charged. If the straight-air pipe pressure fails to develop, the accumulation of the pressure in the timing reservoir 54 will move the switch 29 to open position which causes the magnet valve 25 to be deenergized. The automatic application of the brakes which occurs as a result of the de-energization of the magnet valve 25 is beyond the control of the engineer and can be released only by setting the manual selector for operation of the automatic brakes.

The operation of the differential pressure motor 53 is known in the art and is described and claimed in applicant's Patent No. 2,548,005 assigned to applicant's assignee. The pressure switch 29 opens in those cases where the straight-air pipe pressure fails to develop altogether. The delay produced by the timing reservoir 54 is quite short and the operation of this safety feature indicates a major derangement of the system.

When the electro-pneumatic straight-air brake is applied, charging flow to the supply reservoirs 20, through the brake pipe 12 increases markedly. A differential pressure is thus established between the feed valve 37 and the connection 38. As a result of this increased rate of flow, the differential pressure, when it reaches a certain amount dependent upon the setting of the spring 43 and the pressure in the control pipe 33 causes the switch 31 to be closed. Closure of the switch 31 energizes the magnet valve 32 thus opening the charging connection to the timing reservoir 49. The charging of the timing reservoir 49 continues until the rate of flow through the brake pipe is again reduced below the amount necessary to actuate the differential pressure motor 33. Under normal conditions the rate of flow through the brake pipe will be reduced below this amount before the accumulation of pressure in the timing reservoir 49 reaches an amount sufficient to open the pressure switch 28. If the rate of flow through the brake pipe does not return to normal within this predetermined time interval the pressure switch 28 will be opened thus de-energizing the magnet valve 25 and applying the brakes. The failure of the rate of flow of air through the brake pipe to return to normal indicates excessive leakage from the system particularly from the straight-air pipe such as may result from failure of one or more of the release magnet valves to be closed or from leakage from the brake cylinder or the brake cylinder pipe.

The operation of the system, as shown in Figs. 1B and 2, is similar to the operation of the equipment shown in Figs. 1A and 2. Actuation of the differential pressure motor causes the switch 31 to be closed and energizes the electric heater 57. If the rate of flow through the brake pipe does not return to normal within the predetermined time period, the thermostatic switch 58 will open and cause the magnet valve 25 to be de-energized thus producing an automatic application of the brakes.

It will be understood that while the invention has been described in connection with 24RL equipment it is not limited to use with this equipment.

Basically the invention includes a differential pressure motor which is connected to be actuated by charging flow to the supply reservoirs on the train units in a straight-air brake system. In the described embodiment this charging flow occurs through the brake pipe of an automatic brake system. Equivalent components of other brake systems can equally well be employed.

The actuation of the differential pressure motor causes a switch to be closed which in turn initiates the accumulation of energy at a given rate. This accumulation of energy, for example the accumulation of pressure in the timing reservoir or the accumulation of heat at the thermostatic switch is effective after a predetermined time interval to actuate a switch which operates some type of brake applying mechanism. The reduction of the charging flow to a predetermined amount stops the accumulation of energy and the safety device is then returned to its normal condition by the dissipation of the energy accumulated.

What is claimed is:

1. The combination of an electro-pneumatic brake system comprising a straight-air pipe; charging and vent valve means operatively associated with said straight-air pipe to control the pressure therein; a pneumatically actuated master controller arranged to actuate said charging and vent valve means and having pneumatically actuated follow-up means responsive to resulting changes in straight-air pipe pressure; a control pipe communicating pressure to said master controller; a source of pressure fluid; a flow communication between said source and said control pipe; an engineer's brake valve in said flow communication effective to control the charging and venting of said control pipe from said source; at least one supply reservoir; a brake cylinder and a relay valve operatively associated with each supply reservoir, and the straight-air pipe, the relay valve being rendered effective in response to pressure in the straight-air pipe to admit pressure from the reservoir to the brake cylinder and thereby establish a pressure related to straight-air pipe pressure in the brake cylinder; a supply connection between said source and each supply reservoir; brake actuating means independent of said straight-air pipe; a normally inert differential pressure motor actuated by a predetermined difference between the pressures existing at spaced points in said supply connection; an electric circuit including switch means controlled by actuation of said motor; means controlled by the switch and effective when said motor is actuated to accumulate energy; and means responsive to the accumulation of energy and effective when said accumulation of energy reaches a predetermined amount to operate said brake actuating means.

2. The combination defined in claim 1 in which said means to accumulate energy comprises a timing reservoir having a restricted vent; a conduit connecting said reservoir to said source; flow restricting means in said conduit; and a normally closed solenoid valve in said conduit, said valve being opened by movement of said switch in response to actuation of the differential pressure motor.

3. The combination defined in claim 1 in which said switch is closed by actuation of said motor and in which said means to accumulate energy comprises an electric heater connected in series with said switch and in which the means responsive to the accumulation of energy includes a thermostatic element arranged to be heated by said heater and effective when heated to a predetermined temperature to operate said brake actuating means.

4. The combination defined in claim 1, a pressure motor acting in opposition to said differential pressure motor, said motor being charged from said control pipe.

5. The combination defined in claim 1 and a second pressure motor effective when charged to act in opposition to the action of said differential pressure motor, said motor being charged from said control pipe; and adjustable biasing means acting in opposition to the action of said differential pressure motor.

6. In fluid pressure, train brake apparatus of the type including an automatic brake system and an electro-pneumatic straight-air brake system, said systems existing side by side throughout the train and being selectively effective; the combination of a source of fluid under pressure; an engineer's brake valve; a normally charged brake pipe; a normally vented control pipe, said brake pipe being charged through said brake valve unless it is in a position to produce an automatic brake application and said control pipe being vented unless said brake valve is in a position to produce an electro-pneumatic straight-air application of the brakes; a normally vented straight-air pipe; charging and vent valve means operatively associated with said straight-air pipe to control the pressure therein; a pneumatically actuated master controller arranged to actuate said charging and vent valve means and having pneumatically actuated follow-up means responsive to resulting changes in straight-air pipe pressure, said master controller being controlled in response to variations in control pipe pressure; a flow connection between said source and said straight-air pipe controlled by the charging and vent valve means, said apparatus also including at least one car unit which includes a brake cylinder, a relay valve, a supply reservoir and a control valve, said relay valve serving to admit pressure fluid to said brake cylinder from said supply reservoir and controlled during electro-pneumatic straight-air operation in response to straight-air pipe pressure and during automatic brake operation in response to brake pipe pressure; a supply connection between the supply reservoir and the brake pipe, said supply connection passing through the control valve and closed thereby only when an automatic brake application is in effect; a normally inert differential pressure motor actuated by a predetermined difference between the pressures existing in said brake pipe at spaced points therein; a fluid pressure motor receiving fluid from said control pipe and acting in opposition to said differential pressure motor; adjustable biasing means acting in opposition to said differential pressure motor; an electric circuit including a normally open switch, said switch being operatively connected with said differential pressure motor and closed whenever said differential pressure motor is actuated and overcomes the forces exerted by the pressure motor and by said adjustable means; means to accumulate energy rendered effective by closure of said switch and means responsive to the accumulation of energy and effective when the accumulation reaches a predetermined amount to produce an automatic brake application.

7. The combination defined in claim 6 in which said means to accumulate energy comprises a timing reservoir having a restricted vent; a conduit connecting said reservoir to said source; flow restricting means in said conduit; and a normally closed solenoid valve in said conduit, said valve being opened by movement of said switch in response to actuation of the differential pressure motor.

8. The combination defined in claim 6 in which said switch is closed by actuation of said motor and in which said means to accumulate energy comprises an electric heater connected in series with said switch and in which the means responsive to the accumulation of energy includes a thermostatic element arranged to be heated by said heater and effective when heated to a predetermined temperature to produce an automatic brake application.

9. The combination defined in claim 6 in which the means responsive to the accumulation of energy comprises a normally closed switch, said switch being open when said accumulation reaches a predetermined amount and a second normally closed switch connected in series therewith; a differential pressure motor connected to said normally closed switch and means biasing said motor to a position in which it maintains said switch closed, said differential pressure motor having two opposed working spaces, one of which is in free communication with said straight-air pipe the other of which is in free communication with a timing reservoir and in restricted communication with said control pipe and means affording a one way flow communication from said reservoir to said control pipe and by-passing the restricted communication, the pressure in the second named working space urging the motor in a switch-opening direction.

10. The combination of a straight-air brake system comprising a source of fluid under pressure; a normally vented straight-air pipe; charging and vent valve means operatively associated with said straight-air pipe so as to admit pressure fluid thereto from said source or to vent pressure fluid therefrom to atmosphere; a plurality of relay valves connected with said straight-air pipe; a supply reservoir and a brake cylinder associated with each of said relay valves so that charging and venting of the straight-air pipe renders the relay valve effective to establish a pressure related to straight-air pipe pressure in said brake cylinder; a charging connection from said source to said supply reservoirs; brake actuating means independent of straight-air pipe; a normally inert differential pressure motor actuated by a predetermined difference between the pressures existing in in said charging connection at spaced points; an electric circuit, including switch means controlled by actuation of said motor; means controlled by the switch, and effective to accumulate energy when said pressure motor is actuated, and means responsive to the accumulation of energy, and effective when said accumulation reaches a predetermined amount to operate said brake actuating means.

References Cited in the file of this patent

UNITED STATES PATENTS

| 1,700,428 | Breeze | Jan. 29, 1929 |
| 2,527,920 | Elsworth | Oct. 31, 1950 |